United States Patent [19]
Fujii et al.

[11] Patent Number: 5,815,636
[45] Date of Patent: Sep. 29, 1998

[54] IMAGE REPRODUCING APPARATUS

[75] Inventors: Akio Fujii, Yokohama; Hidenori Hoshi, Kawasaki, both of Japan

[73] Assignee: Canon Kabushiki Kaisha, Tokyo, Japan

[21] Appl. No.: 899,885

[22] Filed: Jul. 24, 1997

Related U.S. Application Data

[63] Continuation of Ser. No. 218,928, Mar. 28, 1994, abandoned.

[30] Foreign Application Priority Data

| Mar. 29, 1993 | [JP] | Japan | ................................... 5-093554 |
| Mar. 31, 1993 | [JP] | Japan | ................................... 5-096859 |
| Mar. 31, 1993 | [JP] | Japan | ................................... 5-096871 |

[51] Int. Cl.$^6$ .............................. H04N 5/76; H04N 5/92
[52] U.S. Cl. .......................... 386/116; 386/124; 360/32; 371/37.01
[58] Field of Search .......................... 371/30–31, 37.01, 371/38.01, 39.01; 348/616; 386/2, 21, 23, 47, 50, 111, 112, 113, 116, 114, 40, 124; 360/32, 98; H04N 5/76, 5/94, 5/92

[56] References Cited

U.S. PATENT DOCUMENTS

| 5,070,503 | 12/1991 | Shikakura | ................................ 358/336 |
| 5,247,363 | 9/1993 | Sun et al. | ................................... 386/50 |
| 5,353,059 | 10/1994 | Lawlor et al. | .......................... 358/336 |
| 5,365,604 | 11/1994 | Kwok et al. | ............................. 348/616 |
| 5,392,129 | 2/1995 | Ohtaka et al. | .......................... 358/336 |
| 5,400,076 | 3/1995 | Iwamura | ................................. 348/416 |
| 5,410,553 | 4/1995 | Choon | ....................................... 371/31 |
| 5,420,872 | 5/1995 | Hyodo et al. | ............................. 371/31 |
| 5,581,360 | 12/1996 | Matsumura et al. | ...................... 386/46 |

*Primary Examiner*—Thai Tran
*Attorney, Agent, or Firm*—Fitzpatrick, Cella, Harper & Scinto

[57] ABSTRACT

There is provided an image reproducing apparatus comprises a reproduction circuit for reproducing an image signal which was divided into blocks, an error correction circuit for correcting an error of the image signal reproduced by the reproduction circuit, a constructing circuit for constructing an image signal for the image signal which cannot be corrected by the error correction circuit, and a control circuit for controlling the image signal constructing operation of the constructing circuit on the basis of error correction situations of the blocks which are adjacent to the block including the uncorrectable image signal, wherein a natural image is obtained even for an image of a hard movement and a deterioration of a picture quality can be prevented.

26 Claims, 20 Drawing Sheets n    #n-1

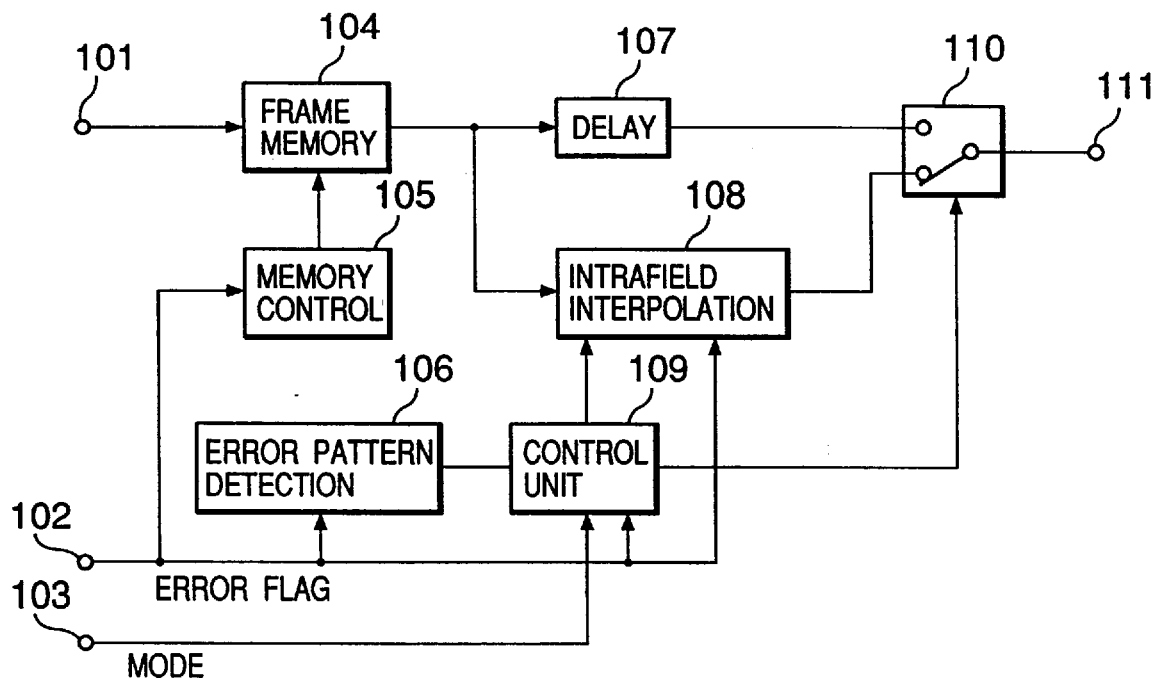

FIG.14

| | | | | | |
|---|---|---|---|---|---|
| I | I87 | J17  J  J87 | K17  K | | |
| | I88 | J18  J88 | K18 | | |
| | P81 | E11  E81 | L11  ODD FIELD | | |
| | P82 | | L12  EVEN FIELD | | |
| P | | X | L | | |
| | P87 | | L17 | | |
| | P88 | E18  E88 | L18 | | |
| | O81 | N11  N81 | M11 | | |
| | O82 | N12  N82 | M12 | | |
| O | | N | M | | |

FIG.15

| | | | | |
|---|---|---|---|---|
| I87 | J17 | J | J87 | K17  K |
| I88 | J18 | | J88 | K18 |
| P81 | e11 | | e11 | L11  ODD FIELD |
| P82 | e12 | | e12 | L12  EVEN FIELD |
| | e13 | | e13 | |
| | e14 | | e14 | |
| P | e15 | X | e15 | L |
| | e16 | | e16 | |
| P87 | e17 | | e17 | L17 |
| P88 | e18 | | e18 | L18 |
| O81 | N11 | | N81 | M11 |
| O82 | N12 | | N82 | M12 |
| O | N | | | M |

FIG.17

| I | | J | | K | |
|---|---|---|---|---|---|
| | I87 | J17 | J87 | K17 | |
| | I88 | J18 | J88 | K18 | |
| | P81 | E11 | E81 | L11 | ODD FIELD |
| | P82 | E12 | E82 | L12 | EVEN FIELD |
| P | | X | | L | |
| | P87 | E17 | E87 | L17 | |
| | P88 | E18 | E88 | L18 | |
| | O81 | N11 | N81 | M11 | |
| | O82 | N12 | N82 | M12 | |
| O | | N | | M | |

FIG.18

| | I | J17 | J | J87 | K17 | K |
|---|---|---|---|---|---|---|
| | I87 | | | | | |
| | I88 | J18 | | J88 | K18 | |
| | P81 | x11  x21  x31  x41  x51  x61  x71  x81 | | | L11 | ODD FIELD |
| | P82 | x12 | | x82 | L12 | EVEN FIELD |
| | | x13 | | x83 | | |
| P | | x14 | | x84 | | L |
| | | x15 | X | x85 | | |
| | | x16 | | x86 | | |
| | P87 | x17 | | x87 | L17 | |
| | P88 | x18  x28  x38  x48  x58  x68  x78  x88 | | | L18 | |
| | O81 | N11 | | N81 | M11 | |
| | O82 | N12 | | N82 | M12 | |
| O | | | N | | | M | ency
IMAGE REPRODUCING APPARATUS

This application is a continuation of Ser. No. 08/218,928 filed Mar. 28, 1994 now abandoned.

BACKGROUND OF THE INVENTION

1. Field of the Invention

The present invention relates to a reproducing apparatus of an image signal and, more particularly, to an image reproducing apparatus for concealing error uncorrectable data of a television moving image signal which was high efficient encoded and for reproducing the image signal.

2. Related Background Art

Hitherto, a digital video tape recorder (VTR) for digitizing a video signal and recording and reproducing has been known as an apparatus of such a kind. In recent years, in such a digital VTR in which a digital image signal is compressed and encoded and is recorded or reproduced has also been proposed.

As a technique for high efficiently compressing and encoding an image signal as mentioned above, an orthogonal transformation encoding method is known. According to the above method, an image signal is divided into blocks every (N pixels in the vertical direction)×(M pixels in the lateral direction) in a lump and, after that, an orthogonal transformation such as a discrete cosine transformation or the like is performed on a block unit basis, and a quantization, an entropy encoding, or the like is performed for coefficents after completion of the transformation.

An image signal is encoded and recorded on a block unit basis in the digital VTR in which an image is compressed and recorded by using the orthogonal transformation encoding method. Therefore, when reproducing, in particular, when a special reproduction such as a search reproduction or the like is performed, the recorded image data is not correctly reproduced. In the case where an error occurred in the encoding data, a code error occurs on a block unit basis. Since a variable length code is frequently used, there are many cases such that a decoding error is propagated over a plurality of blocks, so that it results in a large deterioration of the image.

As a method of concealing the data of a block (hereinlater, referred to as an error block) including error data as data having a low reliability and obtaining a reproduction image as mentioned above, an interframe interpolating method of replacing the data of the error block by only the image of the previous frame is known.

With reference to FIG. 1, the concealing operation by the interframe interpolating method will now be described. FIG. 1 is a diagram showing a state of image blocks in frames #n and #n−1. When a block X of the frame #n is undecodable in FIG. 1, the data of the block X is replaced by the reproduction data of a block A' which is located at the same position on a screen of the previous frame #n−1 and is reproduced.

However, according to such an interframe interpolating method, there is a problem such that in the case where an image moves hard or where as a searching speed becomes higher, the error block is replaced by an image whose correlation is low when comparing with the peripheral blocks in the same field, so that it becomes a large visual obstruction.

SUMMARY OF THE INVENTION

An object of the present invention is to solve the problems as mentioned above.

Another object of the invention is to provide an image reproducing apparatus which can obtain a natural image even for an image of a hard movement such as a high speed reproduction image or the like.

Under such objects, according to the present invention, as one embodiment, there is provided an image reproducing apparatus comprising: (a) reproducing means for reproducing an image signal which was divided into blocks from a recording medium; (b) error correcting means for correcting an error of the image signal reproduced by the reproducing means; (c) constructing means for constructing an image signal for the image signal which cannot be corrected by the error correcting means; and (d) control means for controlling the image signal constructing operation of the constructing means on the basis of error correction situations of the blocks which are adjacent to the uncorrectable image signal.

Further another object of the invention is to provide an image processing apparatus in which in the case where an image signal is constructed for an endecodable image signal, even if the image signal cannot be constructed, another image signal can be constructed.

Under such an object, according to the invention, as one embodiment, there is provided an image processing apparatus for performing a predetermined process for an image signal including an image signal of a low reliability, comprising: (a) concealing means for producing an image signal to conceal the image signal of the low reliability, in which the concealing means includes a plurality of concealing circuits each for producing an image signal by a different algorithm; (b) detecting means for detecting whether the plurality of concealing circuits can be operated or not; and (c) control means for controlling the concealing means on the basis of an output of the detecting means and for selectively outputting the image signals from the plurality of concealing circuits.

The above and other objects and features of the present invention will become apparent from the following detailed description and the appended claims with reference to the accompanying drawings.

BRIEF DESCRIPTION OF THE DRAWINGS

FIG. 5 is a block diagram showing a constructional example of an interpolation circuit in FIG. 4;

FIG. 6 is a diagram for explaining the operation of the intrafield interpolation in the first embodiment of the invention;

FIG. 14 is a diagram for explaining the correcting operation of the second embodiment of the invention;

FIG. 15 is a block diagram showing another constructional example of the interpolation circuit in FIG. 4 as a second embodiment of the invention;

FIG. 17 is a diagram for explaining another correcting operation of the second embodiment of the invention;

FIG. 18 is a block diagram showing a construction of a reproducing system of a digital VTR as a third embodiment of the invention;

DETAILED DESCRIPTION OF THE PREFERRED EMBODIMENTS

Embodiments of the invention will be described hereinbelow. The operation of a recording system of a digital VTR as an embodiment of the invention will be first explained.

Figure 1:
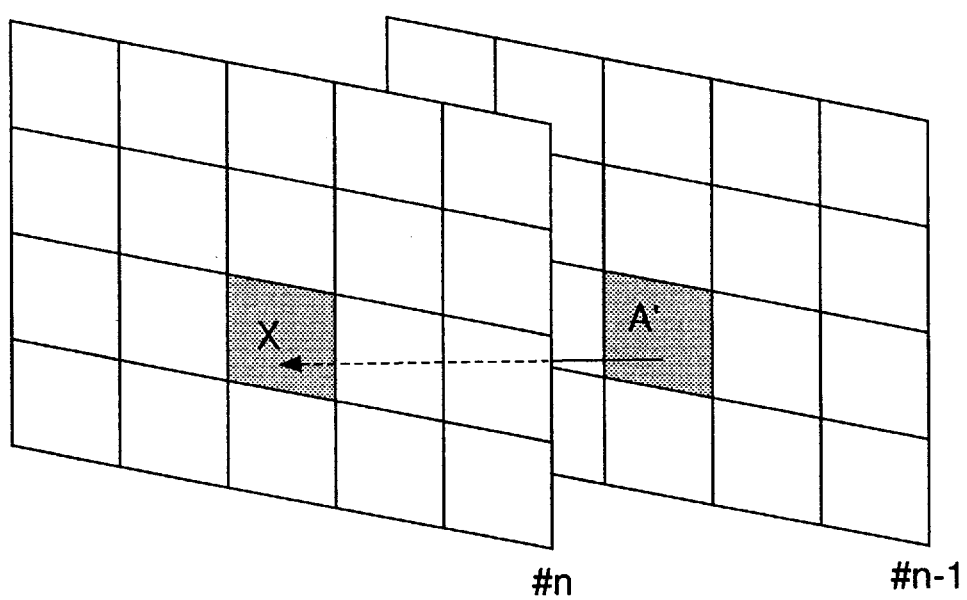
FIG. 1 is a diagram for explaining the operation of the interframe interpolation.
Figure 2:
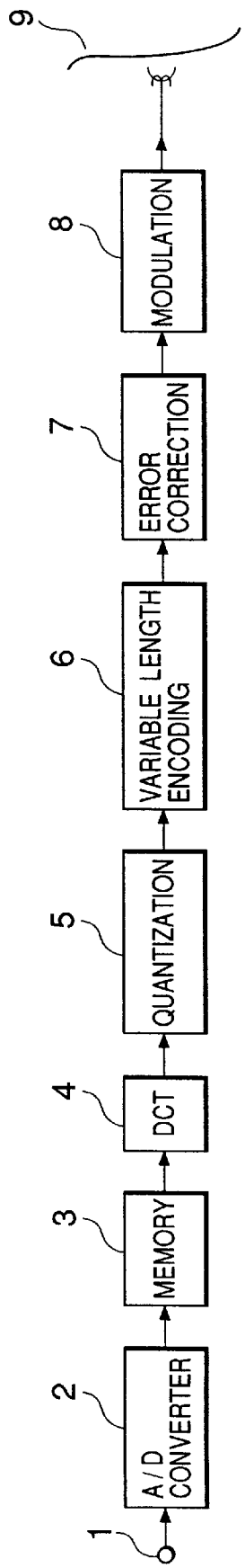
FIG. 2 is a block diagram showing a construction of a recording system of a digital VTR as an embodiment of the invention.

FIG. 2 is a block diagram of the recording system of the digital VTR as an embodiment of the invention.

In FIG. 2, reference numeral 1 denotes an input terminal of image data from a video camera or the like; 2 an analog-digital (A/D) converter; 3 a frame memory; 4 a DCT circuit for performing a discrete cosine transformation (hereinafter, referred to as DCT) as an orthogonal transformation; and 5 a quantization circuit for quantizing each frequency coefficient of image data which was DCT transformed.

Reference numeral 6 denotes a variable length encoding circuit for allocating a variable length code to the quantized data; 7 an error correction encoding circuit for error correction encoding the encoding data in order to record or transmit the data to a medium; 8 a modulation circuit for performing a modulation suitable to a medium or a transmission path; and 9 an output terminal.

The operation of the above recording system will be described hereinbelow with reference to FIG. 2.

Figure 3:
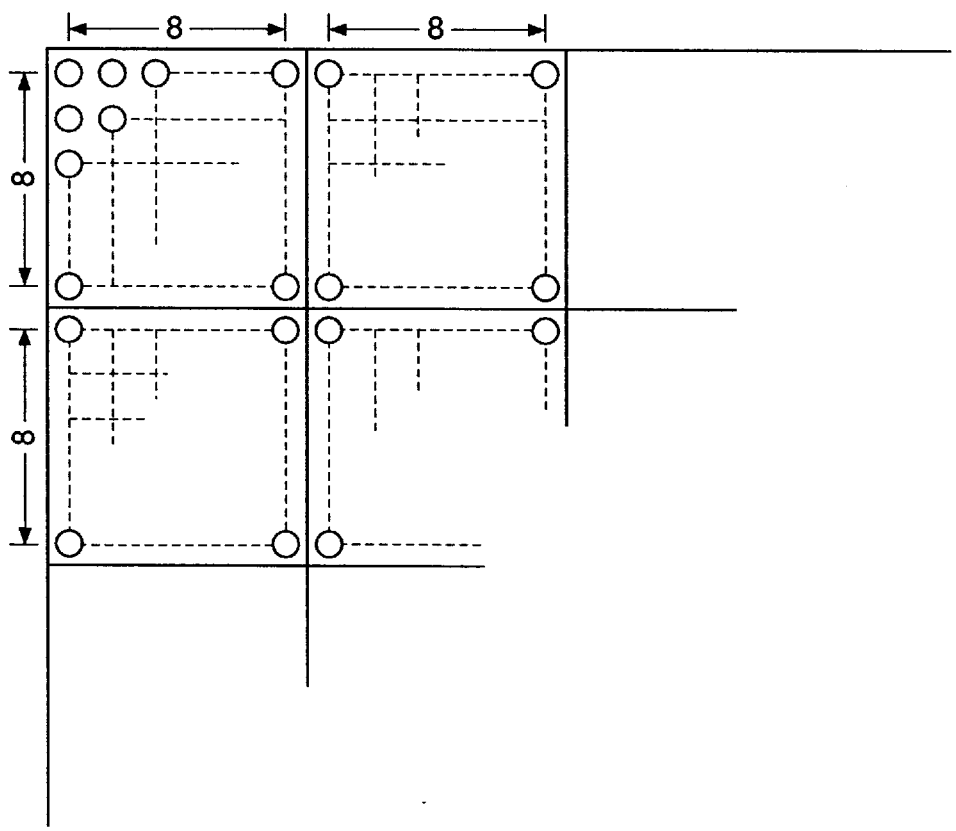
FIG. 3 is a diagram for explaining a state of a block encoding.

Image data which is input from the input terminal 1 is converted from an analog signal into a digital signal of eight bits by the A/D converter 2, and is written into the frame memory 3. The image data is shuffled and is divided into blocks on a unit basis of (8 pixels)×(8 pixels) as shown in FIG. 3 (FIG. 3 shows an arrangement of pixels of the image).

The image data is read out from the memory every block and supplied to the DCT circuit 4. The DCT circuit 4 DCT transforms the image data every block and converts the image data from the space data into the frequency data and generates 8×8 (=64) frequency coefficients.

Generally, since a correlation of an image is strong, when the image is DCT transformed and converted into the frequency data, components of the image can be concentrated to a low frequency area. Further, since a sensitivity is low due to the human eyesight characteristics in a high frequency area, even if the image is slightly coarsely quantized, the deterioration of the image is not conspicuous to the eyes. The quantization circuit 5 uses such an effect and quantizes the frequency coefficients for every block which are supplied from the above DCT circuit 4 by coarse steps in the higher frequency area.

A frequency area is zigzag scanned from the low frequency area toward the high frequency area by the variable length encoding circuit 6 and variable length codes (for example, two-dimensional Huffman codes) are allocated to the quantized coefficients in accordance with the order, thereby reducing an information amount of the image.

The data which was variable length encoded in the variable length encoding circuit 6 is subsequently subjected to the encoding for error correction by the error correction encoding circuit 7 by using a Reed Solomon product code or the like.

The data which was error correction encoded in the error correction encoding circuit 7 is modulated by the modulation circuit 8 in accordance with a recording medium or a transmission path and is recorded onto a magnetic tape by the recording circuit 9.

A case where the image data recorded as mentioned above is reproduced will now be described.

Figure 4:
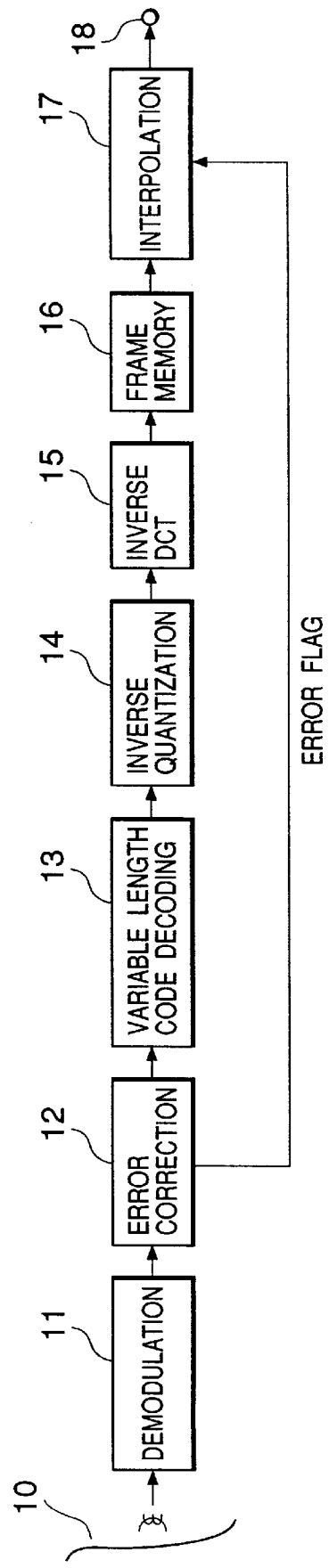
FIG. 4 is a block diagram showing a construction of a reproducing system of the digital VTR as an embodiment of the invention.

FIG. 4 is a block diagram showing a construction of a reproducing system of the digital VTR. In FIG. 4, the image data reproduced by a reproduction circuit 10 is subjected to the demodulation corresponding to the recording by a demodulation circuit 11. After that, the image data is output to an error correction circuit 12. After the code error was corrected by the correction circuit 12 with respect to the input image data, the image data is decoded by a variable length code decoding circuit 13. In this instance, with respect to an error uncorrectable data (hereinafter, referred to as error data), an error flag is output to an interpolation circuit 17. The decoded data is inversely quantized by an inverse quantization circuit 14, after that, the data is inversely DCT transformed by an inverse DCT circuit 15, so that the data in the frequency area is converted into data in the space area.

An output of the inverse DCT circuit 15 is written into a frame memory 16. The data written into the frame memory 16 is deshuffled and is read out in accordance with a raster scan of a monitor or the like. After completion of the interpolation of the error data by the interpolation circuit 17, the data is output from an output terminal 18 and is displayed on a monitor or the like.

The first embodiment of the present invention will now be described. FIG. 5 is a block diagram showing a construction of the interpolation circuit 17 as a first embodiment of the invention.

In FIG. 5, the image data including data having a low reliability, namely, error data from the frame memory 16 in FIG. 4 is supplied from an input terminal 101 and is stored into a frame memory 104. Reference numeral 105 denotes a memory control circuit for controlling writing and reading operations of the frame memory 104. In the case where an error flag for the input image data is supplied from an input terminal 102, the data is not written but the data of the previous frame is output as it is. That is, the interframe interpolation is realized by controlling the writing operation of the frame memory 104.

The image data read out from the frame memory 104 is output to a delay circuit 107 and an intrafield interpolation circuit 108. The delay circuit 107 delays the input data by the time corresponding to the operation time of the intrafield interpolation circuit 108, after that, the data is output to an (a) terminal of a switch 110. The intrafield interpolation circuit 108 forms intrafield interpolation data as will be explained hereinbelow on the basis of a line phase signal from a control unit 109 and an error flag and outputs the data to a (b) terminal of the switch 110.

The error flag from the input terminal 102 is also input to an error pattern detection circuit 106. In the case where the block including the input image data from the input terminal 101 is an error block by using the error flag, the error pattern detection circuit 106 detects whether peripheral eight blocks adjacent to the error blocks are error block or not and outputs an error pattern signal indicating which block is an error block to the control unit 109.

The control unit 109 decides the block which is used for the intrafield interpolation on the basis of the error pattern signal and outputs a line phase signal, which will be described hereinafter, to the intrafield interpolation circuit 108. In the embodiment, the intrafield interpolation is performed by two blocks adjacent to the error block X in the upper and lower, right and left, and diagonal directions as shown in FIG. 6. As for the selection of the block which is used for the interpolation, an upper block A and a lower block B are first selected. In the case where either one of the upper and lower blocks (A and B) is an error block, a left block C and a right block D are selected. Further, in the case where either one of the left and right blocks (C and D) is an error block, either one set (two sets of blocks E and F and blocks G and H) from four blocks of E, F, G, and H which are adjacent in the diagonal direction is selected. Namely, the error pattern signal indicates a situation of the error correction of the peripheral blocks of the error block.

A mode signal indicative of a mode such as normal reproduction, search, still, or the like is input from an operation unit (not shown) to an input terminal 103. The control unit 109 controls the switch 110 on the basis of the mode signal and the foregoing error pattern signal. Fundamentally, in the normal reproduction, the switch 110 is always connected to an (a) terminal and the correct data or the interframe interpolation data is output. In a case other than the normal reproduction, when the error block is input, the switch is connected to a (b) terminal and the intrafield interpolation data is output. In the case where none of the sets of blocks which are used for the intrafield interpolation is selected from among the blocks adjacent to the foregoing error block by the control unit 109, namely, in the case where either one of or both of the blocks of each set are the error blocks, the switch 110 is connected to the (a) terminal.

The image data which is output from the switch 110 as mentioned above is output from an output terminal 111 to the output terminal 18 in FIG. 4.

Figure 7:
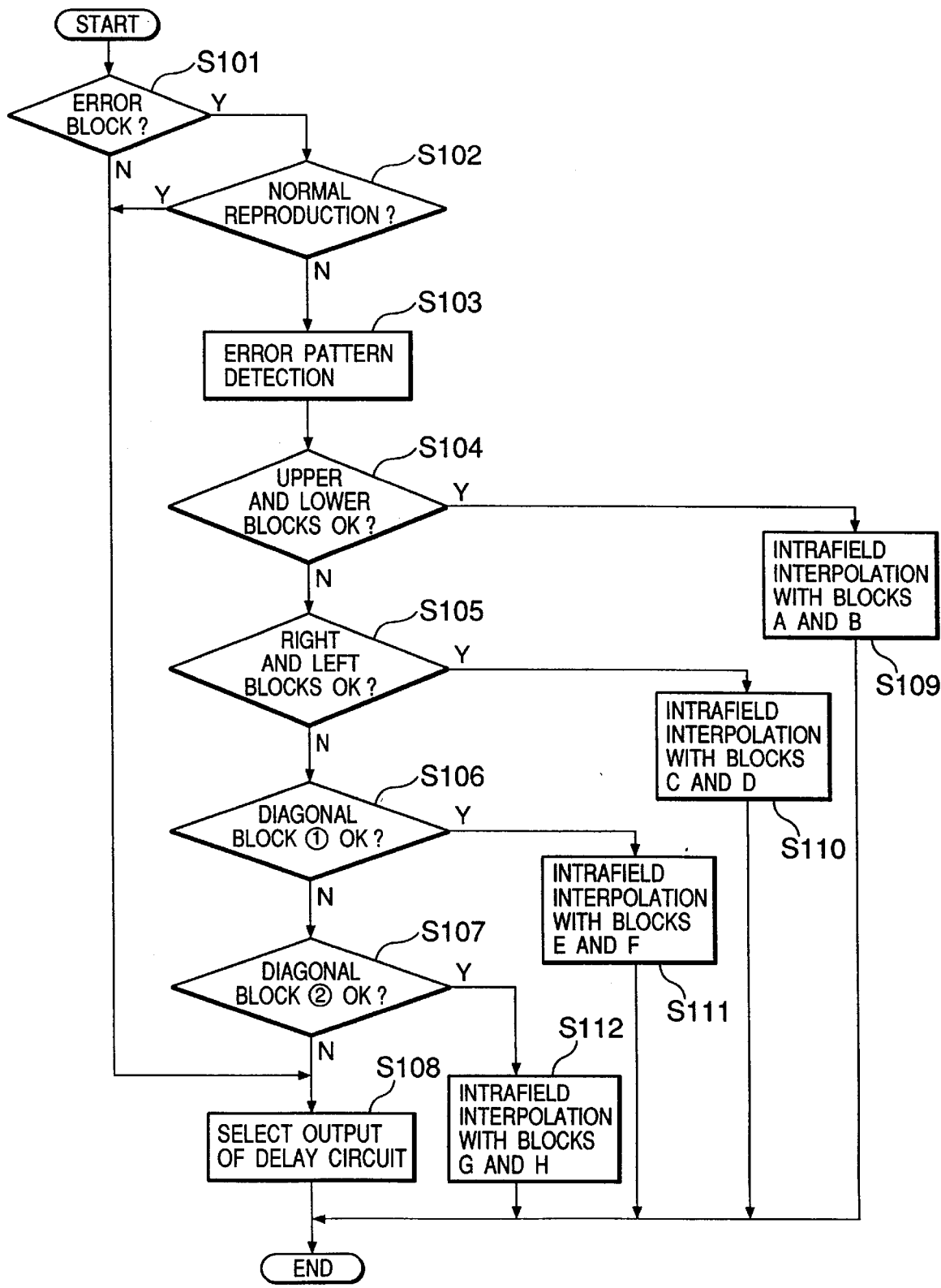
FIG. 7 is a diagram for explaining the operation upon searching in the first embodiment of the invention.

The operation mentioned above will now be described with reference to a flowchart of FIG. 7.

A processing flow is first started by inputting image data from the input terminal 101. In step S101, a check is made to see if the input image data is data of the error block or not on the basis of the error flag from the input terminal 102. In the case where the data is the data of the error block, the memory control circuit 105 controls so as not to write data into the frame memory 104 as mentioned above. In case of the data of the error block, in step S102, in the normal reproducing mode, the control unit 109 connects the switch 110 to the (a) side on the basis of a mode signal from the input terminal 103 and selects the interframe interpolation data.

On the contrary, in case of a mode other than the normal reproducing mode, the control unit 109 controls the intrafield interpolation circuit 108 and the switch 110 as mentioned above on the basis of the output of the error pattern detection circuit 106 (step S103).

That is, in step S104, a check is made to see if both of the upper and lower blocks (blocks A and B in FIG. 6) of the error block are not the error blocks or not. In the case where they are not the error blocks, the intrafield interpolation data is formed by using the image data of the blocks A and B (step S109). On the other hand, in the case where at least either one of the blocks A and B is the error block in step S104, a check is made to see if both of the left and right blocks (the blocks C and D in FIG. 6) of the error block are not the error blocks in step S105. In the case where they are not the error blocks, the intrafield interpolation data is formed by using the image data of the blocks C and D (step S110). On the contrary, in the case where at least either one of the blocks C and D is the error block in step Sl05, a check is made to see if both of the first set of blocks (the blocks E and F in FIG. 6) which are adjacent to the error block in the diagonal direction are not the error blocks in step S106. In the case where they are not the error blocks, the intrafield interpolation data is formed by using the image data of the blocks E and F (step S111). In the case where at least either one of the blocks E and F is the error block, a check is made to see if both of the second set of blocks (the blocks G and H in FIG. 6) which are adjacent to the error block in the diagonal direction are not the error blocks in step S107. In the case where both of the blocks are not the error blocks, the intrafield interpolation data is formed by using the image data of the blocks G and H (step S112).

In the cases where it is judged that the input image data is not the error block in step S101, where it is judged that it is the normal reproducing mode in step S102, and where it is judged that every intrafield interpolation data cannot be formed, the control unit 109 connects the switch 110 to the (a) side and selects the output of the delay circuit 107, thereby outputting the data which was correctly reproduced or the interframe interpolation data (step S108).

In the embodiment as mentioned above, the intrafield interpolation is executed in accordance with which block among the eight blocks adjacent to the error block is the error block (the arrangement of the error block) or how many blocks which are not the error blocks are there (the number of error blocks or non-error blocks).

The operation of the intrafield interpolation circuit 108 will now be explained.

Figure 8B:
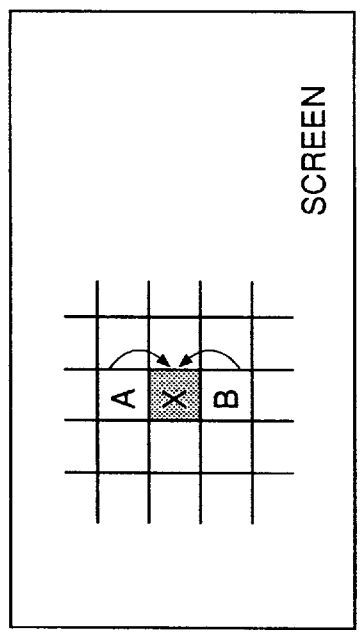
FIGS. 8A and 8B are diagrams for explaining the operation of the intrafield interpolation by a circuit in FIG. 5.
Figure 8A:
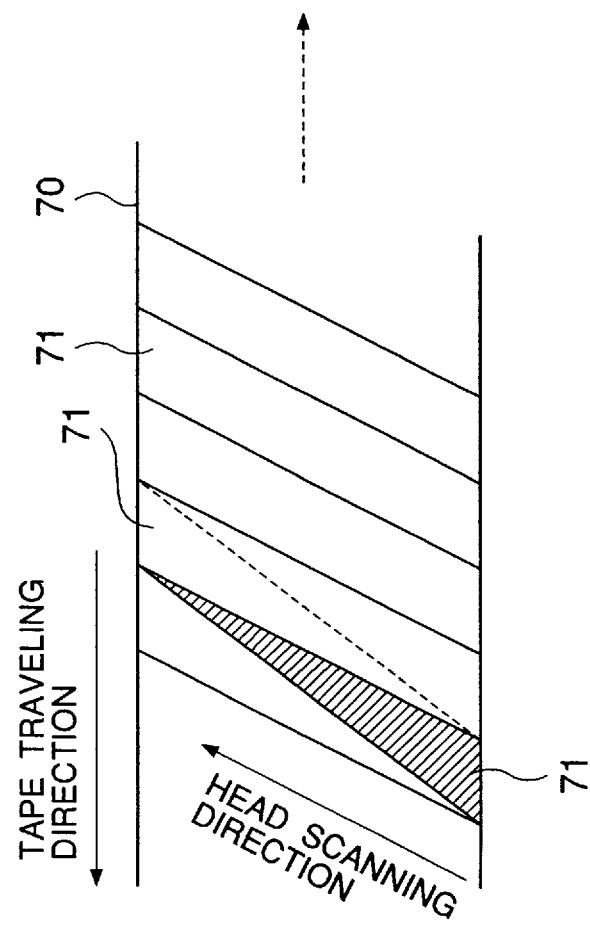

FIGS. 8A and 8B are diagrams for explaining the intrafield interpolation of the error block in the search reproducing mode in the embodiment.

FIG. 8A shows a case where tracks 71 formed on a magnetic tape 70 in the oblique direction is searched and reproduced by helical scanning by heads attached to a rotary drum (not shown). A track 71a shown by a broken line denotes a head scan at that time. A hatched portion 71b is an area which can be actually reproduced when the azimuth angle of the head in the recording mode coincides with the azimuth angle of the head in the reproducing mode.

FIG. 8B is a diagram showing a reproduction screen in a manner similar to FIG. 6. Capital letters A, X, and B indicate encoding blocks. It is assumed that X denotes the error block and A and B denote the blocks which were correctly reproduced. In this case, since the blocks A and B which are adjacent to the error block X in the upper and lower direction have correctly been reproduced (including no error data), the intrafield interpolation is performed by using the image data of the upper and lower blocks A and B instead of the conventional interframe interpolation.

Figure 9:
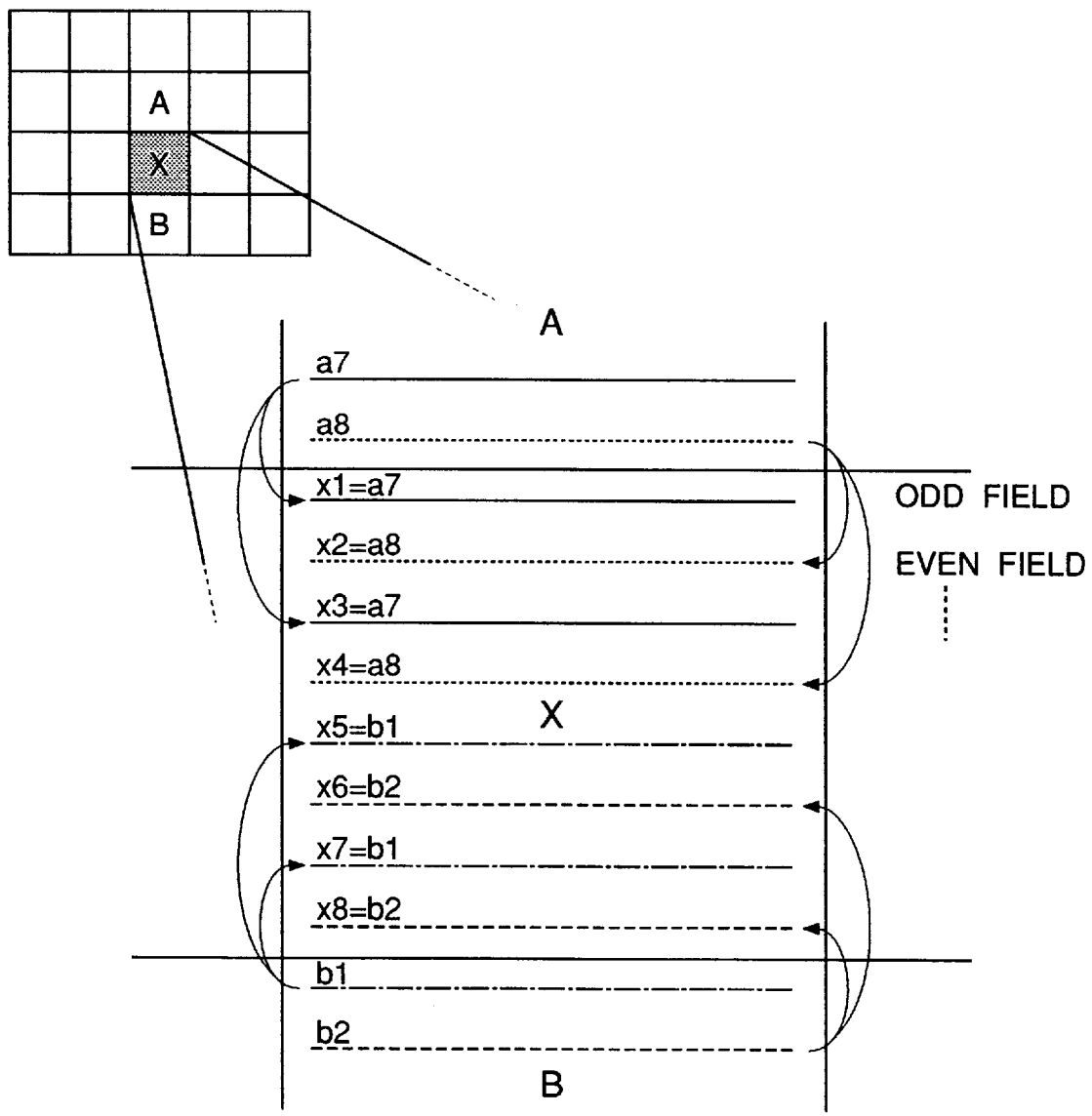
FIG. 9 is a diagram showing a constructional embodiment of the intrafield interpolation circuit in the circuit in FIG. 5.

A processing method at that time will be described with reference to FIG. 9. In FIG. 9, capital letters A, X, and B denote encoding blocks in a manner similar to FIGS. 8A and 8B. Small letters with suffixes denote lines of the image signals included in the encoding blocks X, A, and B. The lines whose suffixes are odd numbers are lines of the odd fields of the image signal and the lines whose suffixes are even numbers are lines of the even fields. As mentioned above, it is assumed that the encoding block is constructed by 8×8 pixels in the frame, namely, (4 lines)×(8 pixels)×(2 blocks) on a field unit basis.

It is assumed that the block X is an error uncorrectable block and the blocks A and B locating at the upper and lower positions of the block X on the screen are correctly reproduced blocks. In the intrafield interpolation in the embodiment, lines x1 to x4 corresponding to four upper lines among the lines x1 to x8 of the error block X can be replaced to lines a7 and a8 as lines in the same field which are nearest to the top lines x1 and x2 of the block X among the lines of the block A. That is, x1=a7, x2=a8, x3=a7, and x4=a8.

On the other hand, the lines x5 to x8 corresponding to four lower lines can be replaced to lines b1 and b2 of the block B as lines in the same field which are nearest to the bottom lines x7 and x8 of the block X in a manner similar to the above. Namely, x5=b1, x6=b2, x7=b1, and x8=b2.

As will be understood from the example, even in the case of the block size of 8×8 pixels, the data constructed by (3 lines)×(8 pixels in the lateral direction) become the same data in the vertical direction in the field.

Figure 10:
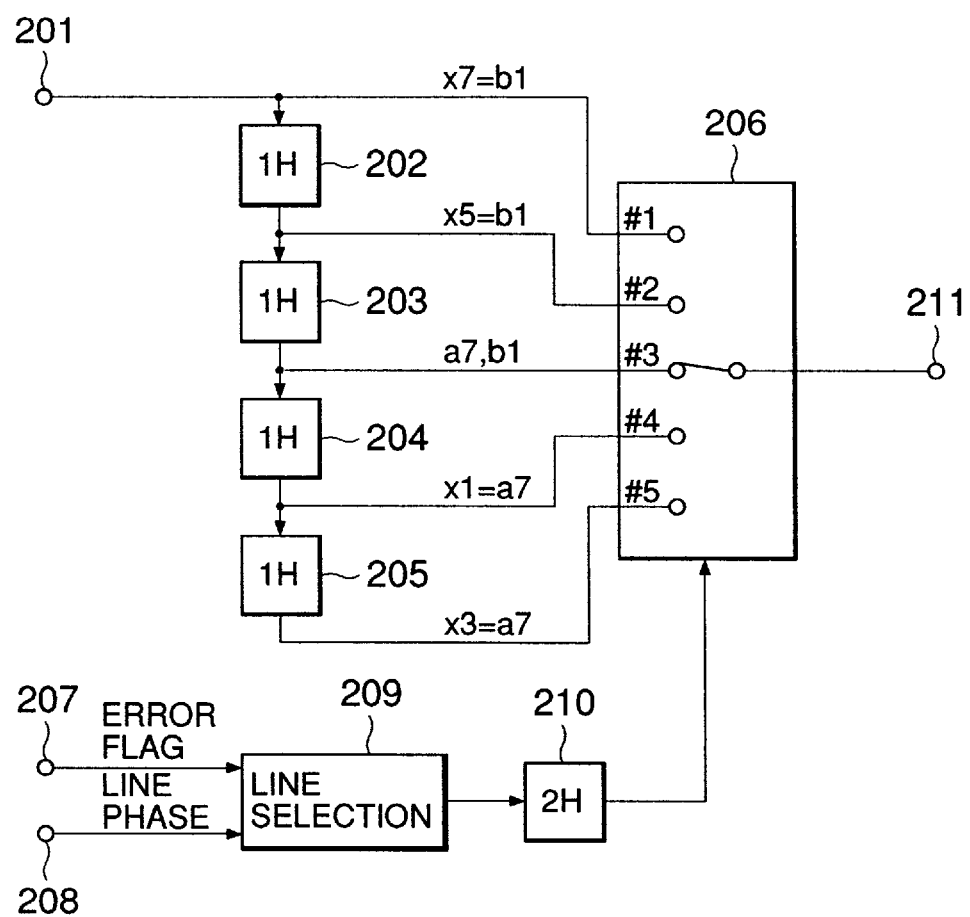
FIG. 10 is a diagram for explaining the operation of the intrafield interpolation by a circuit in FIG. 9.

FIG. 10 is a block diagram showing a construction example of the intrafield interpolation circuit 108 in the embodiment.

In FIG. 10, image data from the frame memory in FIG. 5 is input to an input terminal 201. The input image signal is supplied to a terminal #1 of a selection circuit 206 and is also sequentially delayed by line delay circuits 202, 203, 204, and 205 by one line at a time. The input image signal is shunted every delay and is supplied to terminals #2, #3, #4, and #5 of the selection circuit 206, respectively.

Figure 11:
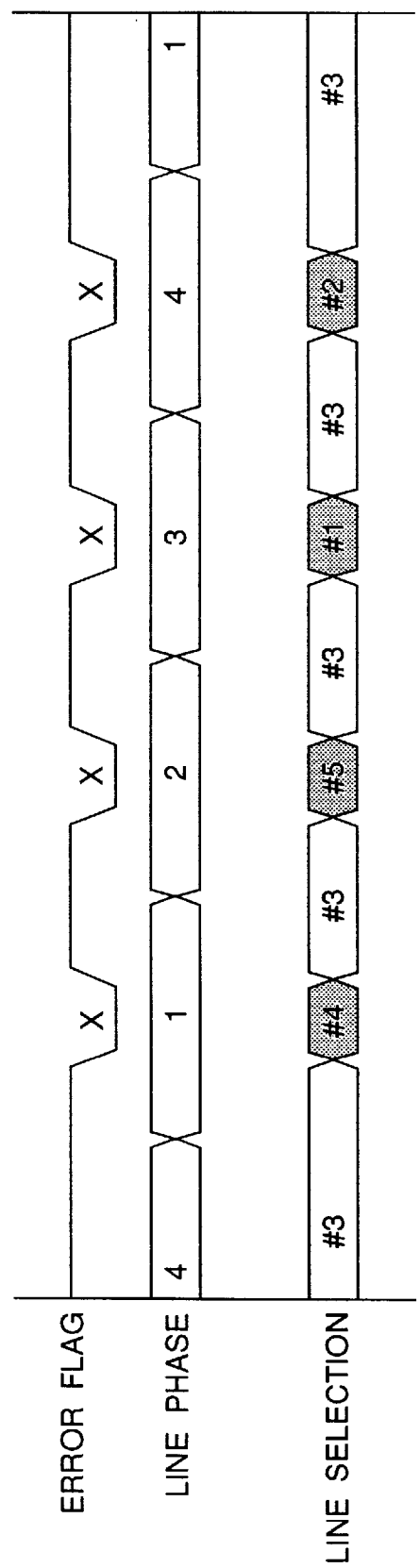
FIG. 11 is a block diagram showing another constructional example of the intrafield interpolation in the circuit in FIG. 5.

The selection circuit 206 is connected to the terminal #3 in an ordinary state in which the interpolation is not executed, and the signal which was delayed by two lines is output. A line phase signal indicative of the position of each line in each block on a field unit of the input image signal as shown in FIG. 11 which was output from the control unit 109 of FIG. 5 is input to an input terminal 208.

An example of FIG. 9 will now be explained. x1, x3, x5, and x7 correspond to line phases 1, 2, 3, and 4 in the odd field, respectively. x2, x4, x6, and x8 correspond to line phases 1, 2, 3, and 4 in the even field, respectively.

The error flag from the input terminal in FIG. 5 is input to an input terminal 207. In a line selection circuit 209, a line selection signal to select the image signal of each delay amount is generated from the error flag signal and the line phase signal with a relation shown in FIG. 11.

The line selection signal controls the connection of the terminals #1 to #5 of the selection circuit 206 until the image signal is supplied from the input terminal 201 to the terminal #3 of the selection circuit 206, namely, after the delay amount which is caused in the path on which no concealment is executed was corrected. Thus the image signal which was block interpolation concealed according to the invention is supplied to an output terminal 211. The image data selected by the switch is output to the switch 110 in FIG. 5 as intrafield interpolation data.

In an apparatus using the block coding, in many cases, a random access memory circuit is used for the decoding process or the conversion or the like from the block formation signal to the raster scan signal. When such an intrafield interpolation of the embodiment is applied to such an apparatus, it is possible to realize the delaying process without adding an exclusive-use delay circuit by controlling the address for writing or reading of the memory circuit.

Figure 12:
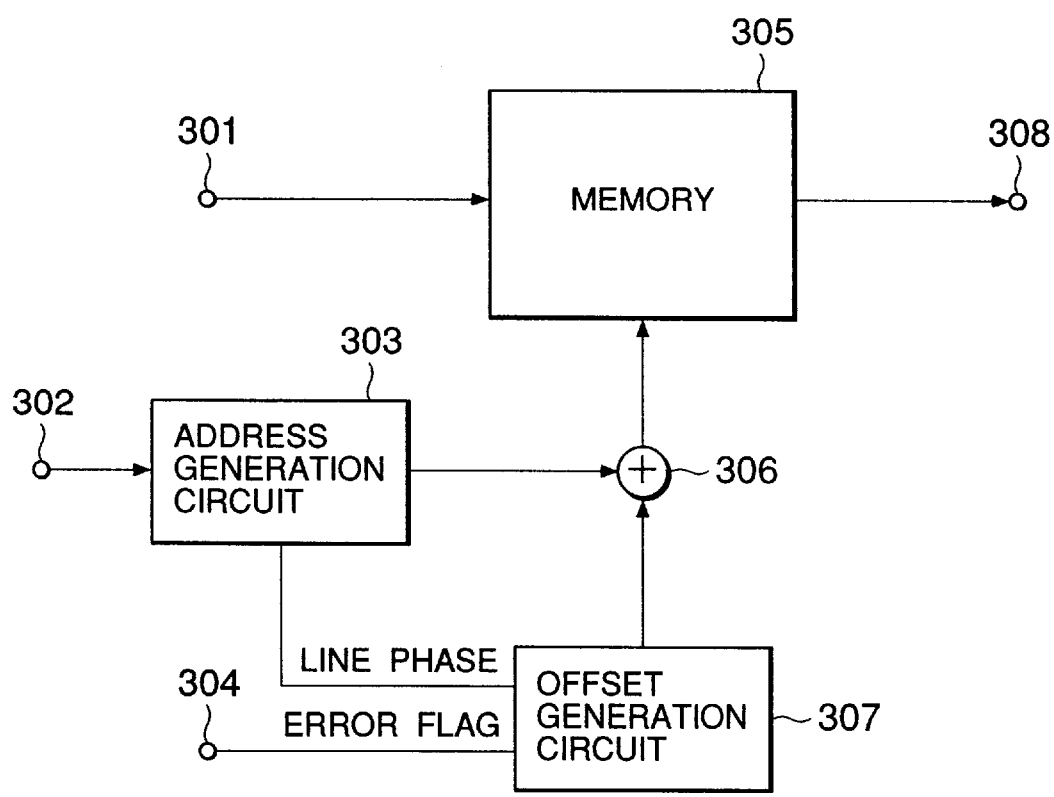
FIG. 12 is a diagram for explaining the correcting operation of the second embodiment of the invention.

FIG. 12 is a block diagram showing a construction to realize the intrafield interpolation by the address control of the memory circuit as another construction example of the embodiment. In FIG. 12, reference numeral 305 denotes a random access memory circuit which stores input data from an input terminal 301 and, thereafter, converts the data to a reproduction image signal and outputs the signal from an output terminal 308. Reference numeral 303 denotes an address generation circuit which generates write and read addresses of the memory circuit 305 by a predetermined sequence on the basis of the line phase signal inputted from the control unit 109 in FIG. 5 to an input terminal 302.

Reference numeral 307 indicates an offset generation circuit for a block concealment according to the invention. The circuit 307 generates an offset amount for the generated address in accordance with the line phase in the block which is supplied from the address generation circuit 303 with respect to the block instructed by a concealment flag which is supplied from an input terminal 304. Reference numeral 306 denotes an address adding circuit for adding the offset amount of the offset generation circuit 307 to the address generated by the address generation circuit 303 and for supplying the resultant address to the address input of the memory circuit 302.

Table 1 shows that the offset amounts for the scan read addresses are sequentially shown by the relative addresses in the vertical direction in the frame in the case where the memory circuit 305 is used as a frame memory.

| Line phase | No concealment | Concealment |
| --- | --- | --- |
| x1 | 0 | − (81 + 2) |
| x2 | 0 | − (81 + 2) |
| x3 | 0 | − (81 + 4) |
| x4 | 0 | − (81 + 4) |
| x5 | 0 | 81 + 4 |
| x6 | 0 | 81 + 4 |
| x7 | 0 | 81 + 2 |
| x8 | 0 | 81 + 2 |

Since this is a frame process, there are eight kinds of line phases of x1 to x8.

Although the example of the intrafield interpolation by the reading address control has been mentioned, it can be also realized by the write address control of the memory.

In the case where the field memory is used for the memory circuit 305, it will be obviously understood that it is sufficient to use only one of the even and odd sequences in the line phases of Table 1 and to reduce the offset amount at the time of concealment to ½. Further, although the case where the upper and lower blocks of the error block were reproduced has been mentioned in the embodiment, the other condition which enables the interpolation in the image plane as mentioned above can be also applied to the case where either one of the set of right and left blocks and the set of diagonal blocks among the eight blocks which are neighboring around the error block was correctly reproduced.

As explained above, according to the embodiment, when the intrafield interpolation is executed, the intrafield interpolation can be executed in accordance with the arrangement or the number of the blocks which don't include the error data in the blocks around the error block, that is, in the case where at least one set of blocks which don't include the error data among the blocks around the error block could be obtained. Accordingly, it is possible to execute the intrafield interpolation even in the case where the upper and lower blocks of the error block include the error data.

Therefore, the image data which was dropped by the high speed reproduction such as a search reproduction or the like can be interpolated by the image data having a high correlation with respect to the time and a good reproduction image can be obtained.

The second embodiment of the invention will now be described. As mentioned above, in the interframe interpolation, in the case where the image data has been interpolated by the image data having a low correlation with the ambient blocks, it becomes a big visual interference particularly in the border portions between the interpolated block and the adjacent blocks. In the embodiment, a digital VTR which can prevent such a deterioration in the picture quality in the border portions will be particularly explained.

Figure 13:
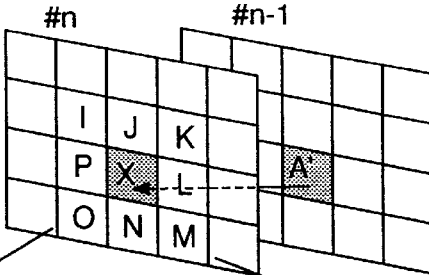
FIG. 13 is a diagram for explaining the correcting operation of the second embodiment of the invention.

FIG. 13 is a diagram to explain the embodiment and shows a block construction of the reproduction image data in a manner similar to FIG. 9. In the embodiment, the case where the invention is applied to the interframe interpolation image will be described.

In FIG. 13, the lines in which M of xNM which shows pixels denotes an odd number are lines of the odd fields of the image signal and lines in which M of xNM indicates an even number are lines of the odd fields. It is now assumed that each of the coding blocks X and I to P is constructed by 8×8 pixels in the frame (N=8, M=8.)

The interpolating process according to the embodiment will now be explained.

It is now assumed that the block X of the frame #n is an error block and the block A locating in the same position as that of the preceding frame #n−1 is a correctly reproduced block. In this case, the interframe interpolation is executed by the block A as mentioned above. The interpolated pixel values are x1 to x88. In the embodiment, prediction error values e11 to e18 and e81 to e88 which have previously been obtained are added to the interpolation pixel values of x11 to x18 and x81 to x88, thereby correcting the interpolation data. In the embodiment, although only the processes of the borders with the right and left blocks L and P will be mentioned, it will be obviously understood that the similar processes are executed with respect to the borders with the upper and lower blocks J and N.

A method of obtaining the prediction error values e11 to e18 and e81 to e88 will be mentioned by using the drawings.

First, in FIG. 14, pixel values of adjacent blocks I, J, K, L, M, N, 0, and P which were correctly reproduced are used apart from the interpolation values which were obtained by executing the interframe interpolation to the data of the block X and the vertexes at four positions of the block X are predicted. E11, E18, E81, and E88 are prediction values of them and they are obtained, for example, by the following equations.

$$E11=(I88+J18+P81)/3$$

$$E18=(P88+N11+O81)/3$$

$$E81=(J88+K18+L11)/3$$

$$E88=(L18+M11+N81)/3 \quad (1)$$

The prediction errors for six pixels between the two points are obtained by the linear interpolation by using E11 and E18. With respect to E81 and E88, the prediction errors for six pixels between the two points are also obtained by the linear interpolation in a manner similar to the above. FIG. 15 shows such a situation. The linear interpolation is obtained, for example, by the following equations.

$$e11=E11-x11$$

$$e12=E11\times6/7+E18\times1/7-x12$$

$$e13=E11\times5/7+E18\times2/7-x13$$

$$e14=E11\times4/7+E18\times3/7-x14$$

$$e15=E11\times3/7+E18\times4/7-x15$$

$$e16=E11\times2/7+E18\times5/7-x16$$

$$e17=E11\times1/7+E18\times6/7-x17$$

$$e18=E18-x18 \quad (2)$$

$$e81=E81-x81$$

$$e82=E81\times6/7+E88\times1/7-x82$$

$$e83=E81\times5/7+E88\times2/7-x83$$

$$e84=E81\times4/7+E88\times3/7-x84$$

$$e85=E81\times3/7+E88\times4/7-x85$$

$$e86=E81\times2/7+E88\times5/7-x86$$

$$e87=E81\times1/7+E88\times6/7-x87$$

$$e88=E88-x88 \quad (3)$$

The prediction error values e11 to e18 and e81 to e88 obtained as mentioned above are added to the pixel values x11 to x18 and x81 to x88 at the borders between the interpolation block X and the neighboring blocks P and L. The prediction error values at the borders with the upper and lower blocks J and N can be also similarly obtained and the similar adding process can be executed.

Figure 16:
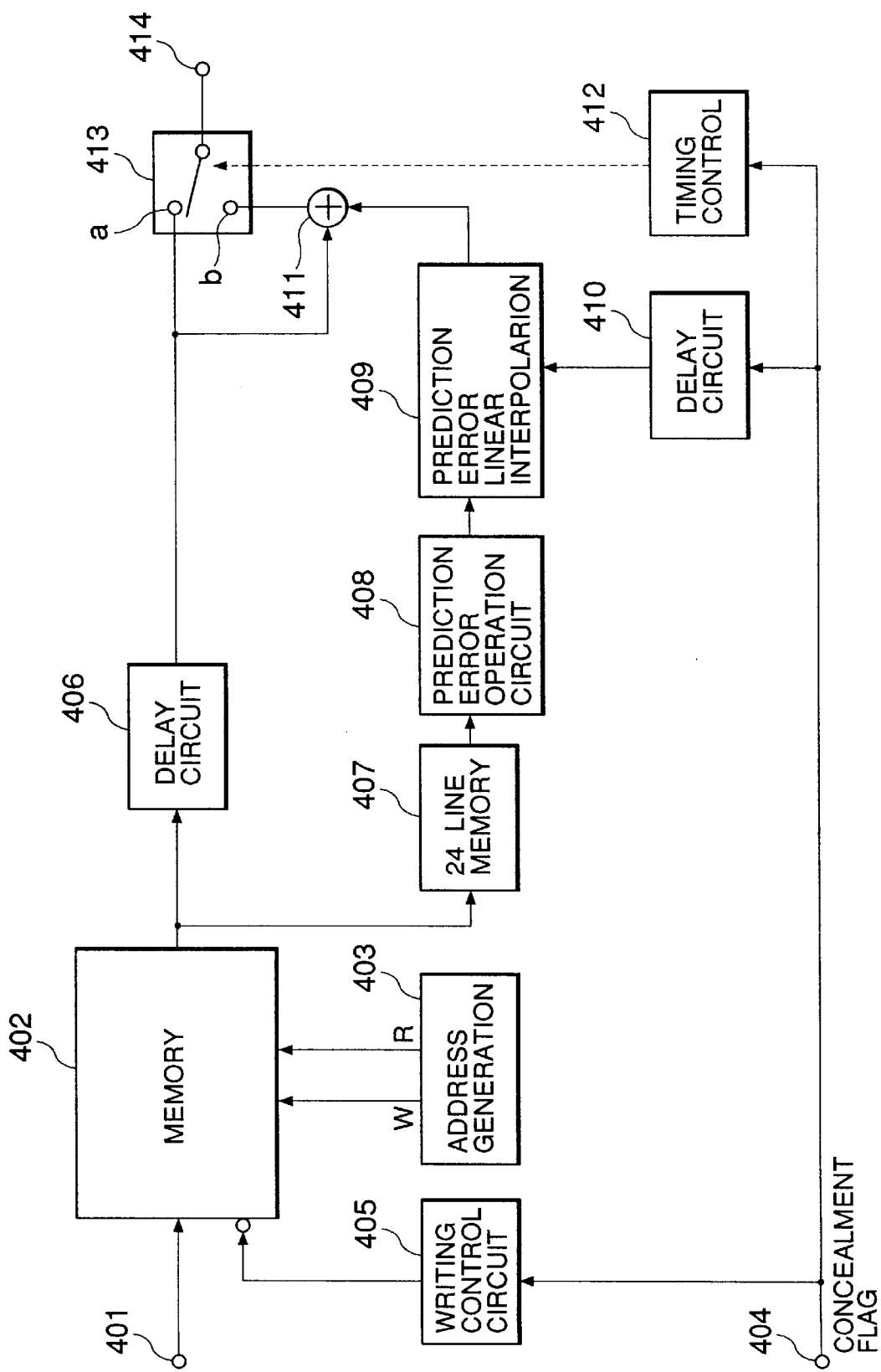
FIG. 16 is a diagram for explaining another correcting operation of the second embodiment of the invention.

FIG. 16 is a block diagram showing another construction example of the interpolation circuit 17 in FIG. 4 in order to realize the interpolation mentioned above. In FIG. 16, a random access frame memory 402 for interframe interpolation stores data which is input from an input terminal 401 and, after that, it is delayed by a delay circuit 406 by a time which is required to produce the prediction error values. The delayed data is supplied to a terminal (a) of a switch 413 and an addition circuit 411. An address generation circuit 403 generates write and read addresses of the memory 402 in accordance with a predetermined sequence.

A memory writing control circuit 405 for the interframe interpolation inhibits the writing to the memory 402 with respect to the block which is indicated by an error flag which is supplied from a terminal 404 that the block includes error data. Therefore, the data of the block in which the writing was inhibited is replaced by the data of the preceding frame. A 24-line memory 407 extracts data which is necessary to correct the interpolation value which was interframe interpolated by the memory 402, namely, data of upper and lower three blocks which include the error block. A prediction error operation circuit 408 extracts the necessary data from the 24-line memory 407 and obtains the prediction error values E11, E18, E81, and E88 shown in the equations (1) and outputs the four values to a prediction error linear interpolation circuit 409. In the prediction error linear interpolation circuit 409, the linear interpolation of the prediction errors as shown in the equations (2) and (3) is executed by the error flag which was delayed by a delay circuit 410 by a period of time which is required for the operation.

In the addition circuit 411, the interpolation value which was interframe interpolated and the prediction error are added and the result is output to a terminal (b). The data change-over switch 413 to switch the terminals (a) and (b) switches an output of the memory 402 and newly concealed data from the addition circuit 411 and supplies to an output terminal 414. That is, with respect to the data in the border portions in the block X, the correction data from the terminal (b) is output. The above switching operation is controlled by a timing control circuit 412 based on the error flag.

Although the example in which the embodiment is realized by the processes on a frame unit basis has been described above, it is also possible to realize it by the processes on a field unit basis. A calculating method of the prediction error in such a case will be described by using FIGS. 17 and 18.

In FIG. 17, an alternate long and short dash line indicates a data line in the odd field and a broken line denotes a data line in the even field. The prediction values of four vertexes of the dropped block are obtained every field by the following equations.

Odd field $$E11=(I87+J17+P81)/3$$

$$E17=(P87+N11+O81)/3$$

$$E81=(J87+K17+L11)/3$$

$$E87=(L17+M11+N81)/3 \quad (4)$$

Even field $$E12=(I88+J18+P82)/3$$

$$E18=(P88+N12+O82)/3$$

$$E82=(J88+K18+L12)/3$$

$$E88=(L18+M12+P82)/3 \quad (5)$$

The prediction error values shown in FIG. 15 are obtained by the prediction error linear interpolation every field of the following equations.

The border with the block P
Odd field $$e11=E11-x11$$

$$e13=E11 \times 2/3+E17 \times 1/3-x13$$

$$e15=E11 \times 1/3+E17 \times 2/3-x15$$

$$e17=E17-x17 \quad (6)$$

Even field $$e12=E12-x12$$

$$e14=E12 \times 2/3+E18 \times 1/3-x14$$

$$e16=E12 \times 1/3+E18 \times 2/3-x16$$

$$e18=E18-x18 \quad (7)$$

The border with the block L
Odd field $$e81=E81-x81$$

$$e83=E81 \times 2/3+E87 \times 1/3-x83$$

$$e85=E81 \times 1/3+E87 \times 2/3-x85$$

$$e87=E87-x87 \quad (8)$$

Even field $$e82=E82-x82$$

$$e84=E82 \times 2/3+E88 \times 1/3-x84$$

$$e86=E82 \times 1/3+E88 \times 2/3-x86$$

$$e88=E88-x88 \quad (9)$$

Therefore, it is possible to realize the embodiment by a construction similar to the processes on a frame unit basis.

It will be obviously understood that it is also similarly possible to obtain the prediction errors every field and to execute the concealment of the interpolation values with respect to the borders with the upper and lower blocks J and N. Although the case where the correction is executed for the interframe interpolation data has been described in the above embodiment, the present invention can be also applied to the intrafield interpolation data and the similar operation and effect can be obtained.

According to the embodiment as mentioned above, by adding the correction values to the interpolation data at the borders of the interpolated block and the neighboring blocks around it, a visually natural concealment image can be obtained at the borders between the interpolation block and the adjacent blocks as compared with that in case of the interpolation from only the preceding frame which has conventionally been used in the block coding. Therefore, by applying the invention to the image recording, transmitting apparatus, and the like using the block coding, there is an effect such that a good reproduction image is obtained for the partial drop of the data.

Figure 19:
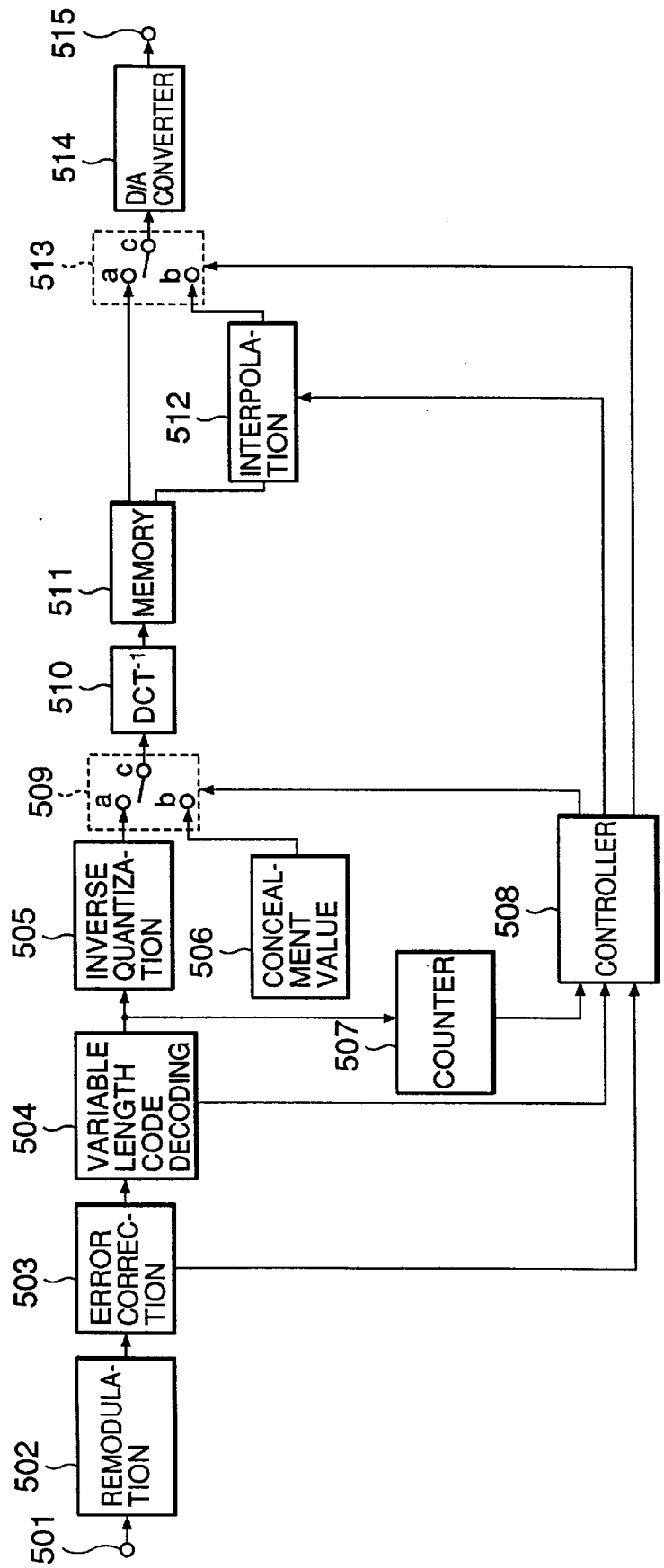
FIG. 19 is a diagram for explaining the operation of an error correction circuit in FIG. 18.

The third embodiment of the invention will now be explained. FIG. 19 is a block diagram showing a reproducing system of a digital VTR as a third embodiment of the invention and shows another construction example of the reproducing system to reproduce the image data recorded by the recording system shown in FIG. 2.

In FIG. 19, reference numeral 501 denotes an input terminal to which image data reproduced from a magnetic tape is input; 502 a demodulation circuit; 503 an error correction circuit for correcting an error caused at the time of recording/reproduction or transmission; 504 a variable length code decoding circuit for decoding variable length encoding data; 505 an inverse quantization circuit; and 506 a concealment value circuit for replacing coefficients after an error to concealment data having a predetermined value when there is the error in the (N×M) block.

Reference numeral 507 denotes a counter circuit to count coefficients which were correctly decoded; 508 a controller to execute various kinds of controls such as sending of control signals to switches 509 and 513 and an interpolation circuit 512 and the like; 510 an inverse DCT circuit; 511 a memory to execute a deshuffling of image data; 512 the interpolation circuit to produce interpolation pixels of the (N×M) block having an error by using adjacent pixels between the frames or in the field as mentioned above; 514 a digital/analog (D/A) converter; 515 an output terminal of a reproduction image signal; and 509 and 513 the switches.

The operation of the reproducing system will now be described with reference to FIG. 19.

Reproduction image data which was input from the input terminal 501 is demodulated by the demodulation circuit 502 and, after that, an error caused at the time of recording/reproduction or transmission is corrected by the error correction circuit 503. When too many uncorrectable errors are caused, an error detection is executed and error flags which presume the error positions are sent to the controller 508.

Figure 20:
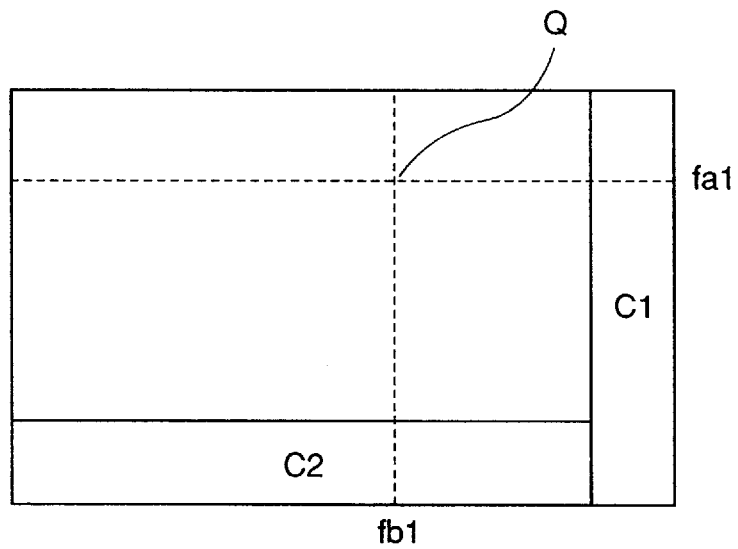
FIG. 20 is a diagram for explaining the interpolating operation in the third embodiment of the invention.

For example, in the case where the image data has been error correction encoded in accordance with the order of an outer code $C_1$ and an inter code $C_2$ by using the Reed-Solomon product code, it is now assumed that a flag $f_{b1}$ indicative of an error detection in the $C_2$ direction is set first and a flag $f_{a1}$ indicative of the error detection in the $C_1$ direction is subsequently set as shown in FIG. 20. The controller 508 checks the flag $f_{a1}$ in the $C_1$ direction and the flag $f_{b1}$ in the $C_2$ direction and presumes that there is an error at a point (Q).

The reproduction data in which error was corrected or detected by the error correction circuit 503 is given to the variable length code decoding circuit 504, by which the variable length code is decoded and quantized coefficient data is obtained every (N×M) block.

Figure 21:
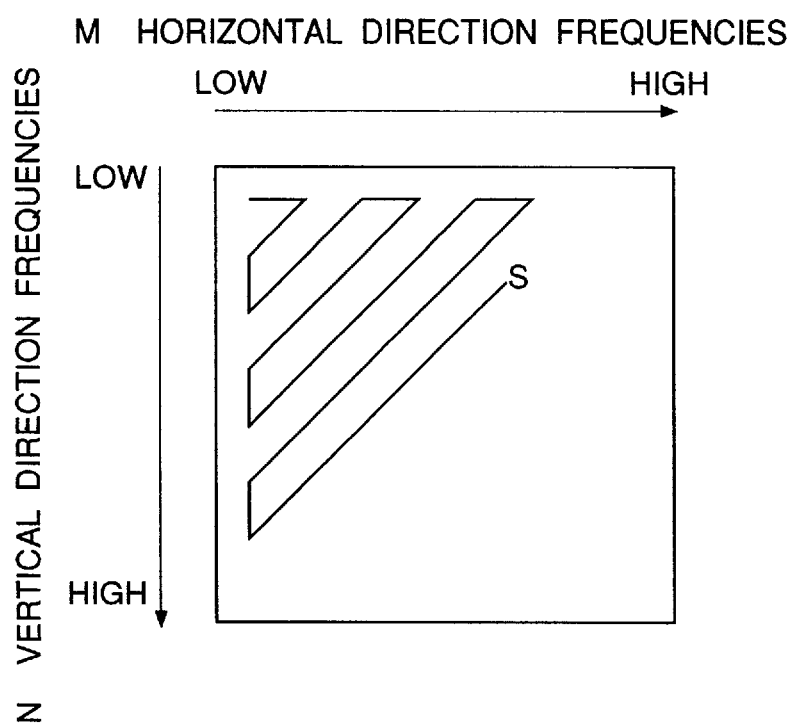
FIG. 21 shows a diagram for explaining order of decoding of variable length code.

However, in the case where the variable length code was decoded sequentially from the low frequency region toward the high frequency region as shown in FIG. 21, now assuming that when the variable length code is decoded until a coefficient (S), an error (Q) is detected, frequency coefficients after the coefficient S cannot be decoded.

Therefore, when there is an error, the variable length code decoding circuit 504 decodes the coefficients until the coefficient (S) which can be decoded and sends them to the inverse quantization circuit 505. Even when the error correction circuit 503 detects no error, if data which cannot be decoded at the time of decoding comes, the variable length code decoding circuit 504 regards that an error exists there and sends the frequency coefficients until (S) which could be decoded before such a point to the inverse quantization circuit 505 and sends a signal indicative of the error to the controller 508.

The counter circuit 507 is reset every decoding processing unit of the (N×M) frequency coefficients and counts the frequency coefficients which are decoded by the variable length code decoding circuit 504. The controller 508 obtains the number (r) of coefficients until the coefficient (S) decoded from the counter circuit 507 on the basis of the error flag from the error correction circuit 503 or the variable length code decoding circuit 504. Therefore, in the case where there is no error, the number (N×M) of decoded coefficients can be obtained from the counter circuit 507.

The coefficient data decoded by the variable length code decoding circuit 504 is inversely quantized by the inverse quantization circuit 505 and is supplied to a terminal (a) of the switch 509 as frequency coefficient data.

The switch 509 is controlled by the controller 508 and selects the terminal (a) side when there is no error and supplies the (N×M) coefficient data to the inverse DCT circuit 510. When there is an error, the controller 508 selects the (a) side of the switch 509 for the beginning of each block so as to normally decode and sends the (r) inversely quantized coefficient data until the coefficient data (S) to the inverse DCT circuit 510.

After that, the controller 508 selects the (b) side terminal of the switch 509 and supplies concealment data having a predetermined value for the (N×M−r) coefficient data from the concealment value circuit 506 to the inverse DCT circuit 510. The concealment value circuit 506 generates, for example, data of zero as a value of the concealment data.

Therefore, when there is an error, the inverse DCT circuit 510 executes an inverse DCT of (N×M) for the (r) coefficient data until the coefficient data (S) by using the values which were normally decoded. The inverse DCT of (N×M) is executed to the (N×M−r) coefficient data after the data (S) by using the data in which it is replaced by 0 as a concealment value and the resultant (N×M) pixel value data after the inverse DCT was executed is written into the memory 511.

On the other hand, when there is no error, the inverse DCT circuit 510 executes the inverse DCT to the (N×M) coefficient data which was normally decoded and the (N×M) pixel value data is written into the memory 511.

The pixel value data written in the memory 511 is read out from the memory 511 in accordance with the order of the raster scan after the data was deshuffled. When there is an error in the (N×M) block, the controller 508 controls the switch 513, for example, as follows.

When the number (r) of coefficient data which were normally decoded satisfies, for example, r≧N×M/2, that is, when more than half of one block is normally decoded, the controller 508 selects the terminal (a) of the switch 513 and derives the normally decoded coefficients until (r) coefficients. With respect to the (N×M−r) data after (r), the image data reproduced by using the concealment data having the concealment value (0) is supplied to the D/A converter.

When the number (r) of coefficient data which were normally decoded is r<N×M/2, that is, when less than half of one block is normally decoded, the controller 508 selects the terminal (b) side of the switch 513 and supplies interframe or intrafield interpolation data from the interpolation circuit 512 to the D/A converter 514. On the other hand, when there is no error in the (N×M) block, the controller 508 selects the terminal (a) side of the switch 513.

As described above, when an error occurs in the (N×M) block, the (r) coefficients which were normally decoded until the error are used as they are. The (N×M−r) coefficients after the error are replaced by the concealment values and the inverse DCT is executed, thereby obtaining the pixel value data in the space region. Depending on the size of the coefficient (r), whether the pixel value data in which the coefficients were replaced by the concealment values and the inverse DCT was executed is used as a reproduction image or the interpolation value from the pixel data of the adjacent blocks between the frames or in the field in the space region is used as a reproduction image is switched, thereby obtaining a better reproduction image in which unnaturalness is small.

According to the embodiment as mentioned above, either one of the data decoded by using the preset concealment data for the error data and the image data and the data decoded by using the interpolation data and the encoding data from neighboring data for the error data can be switched and output in accordance with the number of error data detected by the error correcting means. In case of the occurence of an error or a moving image or even in case of reproducing a very fine image, a good reproduction image can be obtained by reducing unnaturalness.

Although the case where the invention is applied to the digital VTR has been explained in the embodiments mentioned above, the present invention can be also applied to an apparatus or the like to receive and reproduce (decode) an image signal which was compressed and transferred by the MPEG standard or the like and similar operation and effects can be obtained.

What is claimed:

1. An image reproducing apparatus, comprising:

(a) reproducing means for reproducing an image signal from a recording medium to provide a reproduced image signal divided into blocks each including a plurality of pixels;

(b) error correcting means for correcting an error in the reproduced image signal;

(c) constructing means for constructing a replacement block of the image signal for an error block including an error which cannot be corrected by said error correcting means by using blocks adjacent to the error block; and (d) control means for detecting error correction results of each of the blocks adjacent to the error block and determining the blocks to be used by said constructing means among the blocks adjacent to the error block according to the error correction results of each of the blocks adjacent to the error block.

2. An apparatus according to claim 1, wherein said control means controls the operation of said constructing means on the basis of an arrangement of the one block within the blocks which are adjacent to the one block.

3. An apparatus according to claim 1, wherein said control means controls the operation of said constructing means on the basis of a number of the blocks which are adjacent to the one block and which include an error uncorrectable image signal.

4. An apparatus according to claim 1, wherein said constructing means includes a plurality of constructing circuits each for constructing a replacement block of image signal by a different algorithm.

5. An apparatus according to claim 4, wherein said control means includes a selection circuit for detecting whether operations by said plurality of constructing circuits can be performed or not on the basis of the error correction situations, and for selectively generating the replacement blocks from said plurality of constructing circuits on the basis of a result of said detection.

6. An apparatus according to claim 4, wherein said constructing means includes:

a first constructing circuit which can construct a plurality of kinds of image signals by using an image signal on a frame including an error uncorrectable image signal; and a second constructing circuit for constructing an image signal by using an image signal on a frame which is different with respect to time from the frame including the error uncorrectable image signal.

7. An apparatus according to claim 6, wherein said first constructing circuit includes an intra-frame interpolating circuit for constructing a first image signal by using the image signals of the blocks which are adjacent in upper and lower directions to the one block, for constructing a second image signal by using the image signals of the blocks which are adjacent in right and left directions to the one block, and for constructing third and fourth image signals by using the image signals of the blocks which are adjacent in oblique directions to the one block.

8. An image processing apparatus, comprising:

(a) input means for inputting an image signal which is divided into a plurality of blocks each including a plurality of pixels and is then high-efficiency encoded by blocks;

(b) decoding means for decoding the image signal which was inputted by said input means;

(c) detecting means for detecting decoding results indicating whether each of a plurality of blocks adjacent to an error block which is not correctly decoded by said decoding means is correctly decode by said decoding means ;

(d) constructing means for constructing a replacement image signal for the error block by using the decoded image signal of the plurality of blocks adjacent to the error block, said constructing means determining the blocks to be used among the plurality of blocks adjacent to the error block according to the decoding results detected by said detecting means.

9. An apparatus according to claim 8, further comprising control means for controlling an operation of said constructing means on the basis of an arrangement of the one block within blocks of the image signal which are adjacent to the one block.

10. An apparatus according to claim 9, wherein said constructing means can construct a plurality of kinds of image signals by different algorithms in different operations.

11. An apparatus according to claim 10, wherein said control means includes a selection circuit for detecting whether the operations of said constructing means can be performed or not on the basis of said error correction situations and for selectively generating the plurality of kinds of image signals on the basis of a result of the detection.

12. An apparatus according to claim 10, wherein said constructing means can construct a plurality of kinds of first image signals by using the image signal of a frame including the error uncorrectable image signal and can also construct a second image signal by using the image signal of a frame which is different with respect to time from the frame including the error uncorrectable image signal.

13. An image processing apparatus for processing an image signal which is divided into a plurality of pixel blocks each including a plurality of pixels on a screen and high-efficiency encoded by blocks, comprising:

(a) decoding means for decoding the image signal;

(b) concealing means for producing a concealing image signal for an error block including an image signal of low reliability by using the decoded image signals of other pixel blocks around the error block, said concealing means including a plurality of concealing circuits each for producing a concealing image signal by a different algorithm;

(c) detecting means for detecting whether each of the other pixel blocks around the error block on the screen includes the image signals having high reliability; and (d) control means for determining the concealing circuit to be used by said concealing means among the plurality of concealing circuits according to a detection result of said detecting means so that said concealing means selectively produces the concealing image signals from said plurality of concealing circuits.

14. An apparatus according to claim 13, wherein said concealing means includes:

at least one first concealing circuit for producing a first concealing image signal by using an image signal of the frame including the image signal of low reliability; and a second concealing circuit for producing a second concealing image signal by using an image signal of a frame which is different with respect to time from the frame including the image signal of low reliability.

15. An apparatus according to claim 13, wherein said concealing means has at least two of said first concealing circuits each for producing a different image signal.

16. An apparatus according to claim 14, wherein said control means controls said concealing means so as to preferentially generate the first concealing image signal from said first concealing circuit.

17. An apparatus according to claim 13, wherein said detecting means detects whether each of the other image signals around the image signal of low reliability is an image signal of low reliability or not, and detects whether to operate said plurality of concealing circuits or not in accordance with the result of the detection.

18. An apparatus according to claim 14, wherein at least said first concealing circuit can operate in the case where the image signal which is used is an image signal other than the image signal of low reliability.

19. An image reproducing apparatus comprising:
 (a) reproducing means for reproducing an image signal including an image signal of low reliability from a recording medium, the reproduced image signal being divided into a plurality of blocks each including a plurality of pixels;
 (b) concealing means for producing a concealing image signal to conceal an error block including the image signal of the low reliability, by selectively using a plurality of different concealing methods; and
 (c) control means determining the concealing method to be used by said concealing means in accordance with whether a reproducing speed of said reproducing means is a speed corresponding to a recording speed of the image signal.

20. An apparatus according to claim 19, wherein said control means includes a mode detection circuit for detecting whether said apparatus is in a first mode in which the reproducing speed is substantially the same as the recording or a second mode in which the reproducing speed differs from the recording speed.

21. An apparatus according to claim 20, wherein said concealing means includes:
 at least one first concealing circuit for producing a first concealing image signal by using an image signal of a frame including the image signal of low reliability; and
 a second concealing circuit for producing a second concealing image signal by using an image signal of a frame which is different with respect to time from the frame including the image signal of low reliability.

22. An apparatus according to claim 21, wherein said control means preferentially generates the first concealing image signal from said first concealing circuit in at least said second mode.

23. An apparatus according to claim 21, wherein said concealing means has at least two of said first concealing circuits each for producing a different first concealing image signal.

24. An apparatus according to claim 21, wherein said control means further includes a confirmation circuit to confirm whether each of the first and second concealing circuits can operate or not and controls said concealing means on the basis of an output of said confirmation circuit.

25. An apparatus according to claim 24, wherein said confirmation circuit confirms whether another image signal around the image signal of low reliability is an image signal of low reliability or not, and confirms whether said first concealing circuit can operate or not in accordance with a result of the detection.

26. An image processing apparatus, comprising:
 reproducing means for reproducing an image signal which is divided into a plurality of blocks each comprising a plurality of pixels, from a recording medium;
 error correcting means for correcting an error in the reproduced image signal;
 concealing means for generating a concealing image signal for an error block including an error which cannot be corrected by said error correcting means by using blocks adjacent to the error block, said concealing means generating said concealing image signal by selectively using a plurality of groups of blocks respectively including a plurality of blocks of the other blocks; and
 control means for detecting error correcting results of each of the other blocks adjacent to the error block and determining the groups to be used by said concealing means among the plurality of groups of blocks according to the error correction results of each of the other blocks adjacent to the error block.

* * * * *

UNITED STATES PATENT AND TRADEMARK OFFICE
CERTIFICATE OF CORRECTION

PATENT NO. : 5,815,636

DATED : September 29, 1998

INVENTOR(S) : AKIO FUJII ET AL.

Page 1 of 2

It is certified that error appears in the above-identified patent and that said Letters Patent is hereby corrected as shown below:

On the title page,
AT [57], ABSTRACT

"prises" should read --prising--.

COLUMN 1

Line 12, "efficient" should read --efficiency--.
Line 20, "high" should be deleted.

COLUMN 6

Line 8, "not" should be deleted.
Line 54, "is" should read --are--.

COLUMN 7

Line 16, "locating" should read --located--.

COLUMN 9

Line 42, "locating" should read --located--.

UNITED STATES PATENT AND TRADEMARK OFFICE
CERTIFICATE OF CORRECTION

PATENT NO. : 5,815,636

DATED : September 29, 1998

INVENTOR(S) : AKIO FUJII ET AL.

It is certified that error appears in the above-identified patent and that said Letters Patent is hereby corrected as shown below:

COLUMN 16

Line 3, "means ;" should read --means;--.

COLUMN 17

Line 21, "the low reliability," should read
        --low reliability--.
    Line 31, "recording" should read --recording
        speed--.

Signed and Sealed this

Third Day of August, 1999

*Attest:*

Q. TODD DICKINSON

*Attesting Officer*      *Acting Commissioner of Patents and Trademarks*